US008463258B2

(12) United States Patent
Parsons et al.

(10) Patent No.: US 8,463,258 B2
(45) Date of Patent: Jun. 11, 2013

(54) EXTENDED WIRELESS DEVICE ACTIVATION

(75) Inventors: Stephen Parsons, Bath (GB); David Thorn, London (GB); Stuart Cochran, Bath (GB)

(73) Assignee: Evolving Systems, Inc., Englewood, CO (US)

( * ) Notice: Subject to any disclaimer, the term of this patent is extended or adjusted under 35 U.S.C. 154(b) by 50 days.

(21) Appl. No.: 13/231,363

(22) Filed: Sep. 13, 2011

(65) Prior Publication Data

US 2012/0094634 A1 Apr. 19, 2012

Related U.S. Application Data

(63) Continuation-in-part of application No. 12/197,396, filed on Aug. 25, 2008, now Pat. No. 8,145,212.

(60) Provisional application No. 61/382,324, filed on Sep. 13, 2010, provisional application No. 61/382,311, filed on Sep. 13, 2010, provisional application No. 61/387,110, filed on Sep. 28, 2010, provisional application No. 60/992,913, filed on Dec. 6, 2007, provisional application No. 61/387,101, filed on Sep. 28, 2010.

(51) Int. Cl.
*H04W 4/00* (2009.01)

(52) U.S. Cl.
USPC ........ 455/433; 455/435.1; 455/411; 455/425; 455/432.3

(58) Field of Classification Search
USPC ................ 455/411, 132.2, 435.1, 435.2, 433, 455/558, 418, 550.1
See application file for complete search history.

(56) References Cited

U.S. PATENT DOCUMENTS 5,887,253 A * 3/1999 O'Neil et al. ................. 455/418
6,014,561 A 1/2000 Mölne
(Continued)

FOREIGN PATENT DOCUMENTS

EP 1703760 A2 9/2006
KR 10-2001-0033025 A 4/2001
(Continued)

OTHER PUBLICATIONS

International Search Report and Written Opinion of PCT/US2010/032200 mailed on Nov. 30, 2010, 7 pages.

(Continued)

*Primary Examiner* — Kathy Wang-Hurst
(74) *Attorney, Agent, or Firm* — Kilpratick Townsend & Stockton LLP

(57) ABSTRACT

Various arrangements for activating a wireless device on a wireless network are presented. A request to attach to the wireless network may be received from the wireless device. The request may specify an international mobile subscriber identity (IMSI). An authentication message may be transmitted to a detection device of the wireless network. The IMSI may be compared to a set of stored blocked IMSIs. Each IMSI of the set of stored blocked IMSIs may be prohibited from being used to access the wireless network. It may be determined that the wireless device may that corresponds to the IMSI is permitted to be attached to the wireless network. In response to determining the wireless device is permitted to attach to the wireless network, authentication of the wireless device may occur.

18 Claims, 9 Drawing Sheets

U.S. PATENT DOCUMENTS

| | | | |
|---|---|---|---|
| 6,167,251 A | 12/2000 | Segal et al. | |
| 6,591,098 B1 | 7/2003 | Shieh et al. | |
| 6,680,601 B2 | 1/2004 | Wallgren | |
| 6,836,651 B2 | 12/2004 | Segal et al. | |
| 7,197,301 B2 | 3/2007 | Netanel | |
| 7,274,928 B2 | 9/2007 | Netanel et al. | |
| 7,444,148 B1 | 10/2008 | Cook | |
| 8,145,212 B2 | 3/2012 | Lopresti et al. | |
| 2001/0029182 A1 | 10/2001 | McCann et al. | |
| 2002/0094808 A1 | 7/2002 | Tiedemann, Jr. et al. | |
| 2003/0031305 A1 | 2/2003 | Netanel et al. | |
| 2003/0119490 A1 | 6/2003 | Mohammed | |
| 2003/0166398 A1 | 9/2003 | Netanel | |
| 2005/0020234 A1 | 1/2005 | Iivari et al. | |
| 2005/0181793 A1 | 8/2005 | Netanel | |
| 2006/0035631 A1 | 2/2006 | White et al. | |
| 2006/0143098 A1 | 6/2006 | Lazaridis | |
| 2006/0205434 A1 | 9/2006 | Tom et al. | |
| 2007/0300294 A1 | 12/2007 | Netanel et al. | |
| 2008/0026740 A1 | 1/2008 | Netanel | |
| 2008/0057935 A1 | 3/2008 | Netanel et al. | |
| 2008/0081592 A1* | 4/2008 | Das et al. | 455/406 |
| 2008/0220740 A1* | 9/2008 | Shatzkamer et al. | 455/411 |
| 2009/0011759 A1 | 1/2009 | Alperovich et al. | |
| 2009/0025070 A1 | 1/2009 | Netanel et al. | |
| 2009/0149175 A1 | 6/2009 | Lopresti et al. | |
| 2010/0273462 A1 | 10/2010 | Thorn et al. | |

FOREIGN PATENT DOCUMENTS

| | | |
|---|---|---|
| KR | 10-2005-0033956 A | 4/2005 |
| KR | 10-2006-0135003 A | 12/2006 |
| WO | WO 00/21275 A1 | 4/2000 |
| WO | WO 01/60092 A3 | 8/2001 |
| WO | WO 02/058361 A2 | 7/2002 |
| WO | WO 02/058361 A3 | 7/2002 |
| WO | WO 2008/118638 A1 | 10/2008 |

OTHER PUBLICATIONS

International Search Report and Written Opinion of PCT/US2008/082484 mailed on Jan. 7, 2009, 9 pages.

International Search Report and Written Opinion of PCT/US2011/051464 mailed on Feb. 23, 2012, 8 pages.

* cited by examiner

EXTENDED WIRELESS DEVICE ACTIVATION

CROSS-REFERENCES

This application claims priority to U.S. Provisional Patent Application No. 61/382,324, filed Sep. 13, 2010, entitled "Extended Wireless Device Activation,", U.S. Provisional Patent Application No. 61/382,311, filed Sep. 13, 2010, entitled "Extended Occasional Access to a Wireless Network,", U.S. Provisional Patent Application No. 61/387,101, filed Sep. 28, 2010, entitled "Semi-Permanent Access to a Wireless Network,", and U.S. Provisional Patent Application No. 61/387,110, filed Sep. 28, 2010, entitled "Controlled Occasional Access to a Wireless Network,", the entire disclosures of which are hereby incorporated by reference.

This application is a continuation-in-part of U.S. patent application Ser. No. 12/197,396, filed Aug. 25, 2008 by Lopresti et al., entitled "Wireless Device Activation,"the entire disclosure of which is hereby incorporated by reference. U.S. patent application Ser. No. 12/197,396 claims the benefit, under 35 U.S.C. §119(e), of the filing date of provisional U.S. Patent Application No. 60/992,913, filed Dec. 6, 2007 by Lopresti et al. and entitled "Wireless Device Activation," the entire disclosure of which is hereby incorporated by reference.

BACKGROUND

In order to operate on a wireless network, a wireless device (e.g., a cellular phone, wireless sensor) generally must be registered on the wireless network. To activate the wireless device on the wireless network, a wireless provider generally undertakes a practice referred to herein as "activation," in which the wireless device is identified to the wireless network using an identifier (such as an international mobile subscriber identifier (IMSI) or similar identifying number, which, in many cases, is encoded on a subscriber identity module (SIM) of the wireless device. In a general sense, this process involves creating a record for the device. In some cases, the record comprises the identifying number, as well as an addressing number (e.g., a phone number for a wireless phone), such as an international ISDN number ("MSISDN") or similar number. This record identifies the device to the network and provides information about the capabilities of the device.

When a new wireless device is purchased, the wireless network must activate the wireless device before the user can use the wireless device on the wireless network. There are, in general, three different ways in which a wireless device can be activated.

In the first case, the wireless device is preactivated prior to sale of the wireless device to the user. This process may be used most frequently for prepaid wireless phones. Under a preactivation scheme, the device has installed therein a SIM card that is assigned an activated IMSI before the device is sold. This technique, while technically feasible, has several downsides. First, because the IMSI is assigned and activated before the device is sold, there may be an enhanced risk of theft and/or other supply-chain "leakage." Second, this technique may require substantial investment in allocating and/or activating IMSIs early in the supply chain, resulting in inefficiencies (for example, maintain a relatively large stock of activated IMSIs corresponding to devices that may not be sold or used for some time). Further, if the supply chain involves rebranding the devices, some of the allocated and activated IMSIs might never be used. Moreover, preactivation of a SIM card generally requires the assignment of an MSISDN to the SIM (by associating the MSISDN with the IMSI assigned to the SIM). Given that MSISDNs (and possibly IMSIs) may be relatively scarce resources, this solution may be less than optimal. Another inefficiency may be the allocation of space in databases of a wireless network with which the wireless device is configured to be used. For example, space in a Home Location Register of the wireless network may be allocated without ever being used.

In the second case, the wireless device is activated at the point-of-sale. While this technique may be suitable for applications in which the wireless device is sold at a relatively sophisticated reseller or agent of the wireless provider, it is unavailable in many cases (including, for example, in the case of prepaid phones or phones that are purchased at locations other than dedicated resellers).

The third option is to sell a wireless device in an unactivated state and require the user to activate the wireless device before use. Because, as noted above, the device is inoperable on the network until activation, the wireless device itself may not be able to be used as the activation vehicle. Hence, the user may have to call the wireless network provider (using a different phone), visit the wireless network provider's website (using a separate computer or some other device), and/or the like. This option may be less than desirable because it imposes an inconvenience on the user, resulting in a competitive disadvantage for the provider in relation to techniques that do not impose similar inconveniences on the user.

BRIEF SUMMARY

Various arrangements for activating a wireless device on a wireless network is presented. In some embodiments, a method for activating a wireless device on a wireless network is presented. The method may include receiving an authentication request based on the wireless device attempting to attach to the wireless network. The authorization request may specify an international mobile subscriber identity (IMSI). The method may include comparing the IMSI to a set of stored blocked IMSIs. Each IMSI of the set of stored blocked IMSIs is prohibited from being used to access the wireless network. The method may include, in response to the comparison, determining the wireless device that corresponds to the IMSI is permitted to be attached to the wireless network. The method may include, in response to determining the wireless device is permitted to attach to the wireless network, causing authentication of the wireless device.

Embodiments may include one or more of the following: The method may include routing, by the wireless network, the authentication request to a detection device based on the IMSI, wherein the detection device is separate from an HLR of the wireless network. Causing authentication of the wireless device may include performing authentication of the wireless device by the detection device, wherein such authentication does not require communication with an authentication center of the wireless network. Causing authentication of the wireless device may include transmitting an authentication response comprising security information to a mobile switching center of the wireless network, wherein the mobile switching center services the wireless device. The method may include identifying a second IMSI corresponding to a second wireless device that has violated at least a rule of a set of rules. The method may include in response to identifying the second IMSI corresponding to the second wireless device that has violated at least the rule of the set of rules, adding the second IMSI to the set of stored blocked IMSIs. The rule may define a limit on a number of signaling messages permissible to be received from wireless devices. The method may include receiving a command from an administrator, to add a second IMSI to the set of stored blocked IMSIs. The method may include in response to receiving the command, adding the second IMSI to the set of stored blocked IMSIs. The method may include transmitting provisioning information corresponding to the wireless device to a plurality of AUCs of the wireless network. The method may include receiving a response from at least one of the plurality of AUCs. Causing authentication of the wireless device may include selecting an AUC from the plurality of AUCs of the wireless network to receive authentication information corresponding to the wireless device based on a response time of the response of the AUC to the transmitted provisioning information. Causing authentication of the wireless device may include transmitting the authentication information corresponding to the wireless device to the selected AUC. The method may include assigning a temporary mobile subscriber integrated services digital network number (MSISDN) to the wireless device that corresponds to the IMSI, wherein the IMSI is a temporary IMSI. The method may include assigning a non-temporary MSISDN and a non-temporary IMSI to the wireless device. The method may include after assigning the non-temporary MSISDN and the non-temporary IMSI to the wireless device, transmitting a first message to a home location register (HLR) of the wireless network. The first message may be for delivery to the wireless device. The method may include receiving a message from the HLR indicating that the wireless device is available to receive the message.

In some embodiments, a detection device for activating a wireless device on a wireless network is presented. The detection device may include a processor. The detection device may include a memory communicatively coupled with and readable by the processor and having stored therein processor-readable instructions. When executed, the instructions may cause the processor to receive a request from the wireless network for authentication of the wireless device. The request may specify an international mobile subscriber identity (IMSI) corresponding to the wireless device. When executed, the instructions may cause the processor to compare the IMSI to a set of stored blocked IMSIs. Each IMSI of the set of stored blocked IMSIs may be prohibited from being used to access the wireless network. When executed, the instructions may cause the processor to, in response to the comparison, determine the wireless device that corresponds to the IMSI is permitted to be attached to the wireless network. When executed, the instructions may cause the processor to, in response to determining the wireless device is permitted to attach to the wireless network, cause the wireless device to be authenticated.

In some embodiments, a detection apparatus for activating a wireless device on a wireless network is presented. The detection apparatus may include means for receiving a request from the wireless network for authentication of the wireless device. The request may specify an international mobile subscriber identity (IMSI) corresponding to the wireless device. The detection apparatus may include means for comparing the IMSI to a set of stored blocked IMSIs. Each IMSI of the set of stored blocked IMSIs may be prohibited from being used to access the wireless network. The detection apparatus may include means for determining, in response to the comparison, the wireless device that corresponds to the IMSI is permitted to be attached to the wireless network. The detection apparatus may include means for causing the wireless device to be authenticated in response to determining the wireless device is permitted to attach to the wireless network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
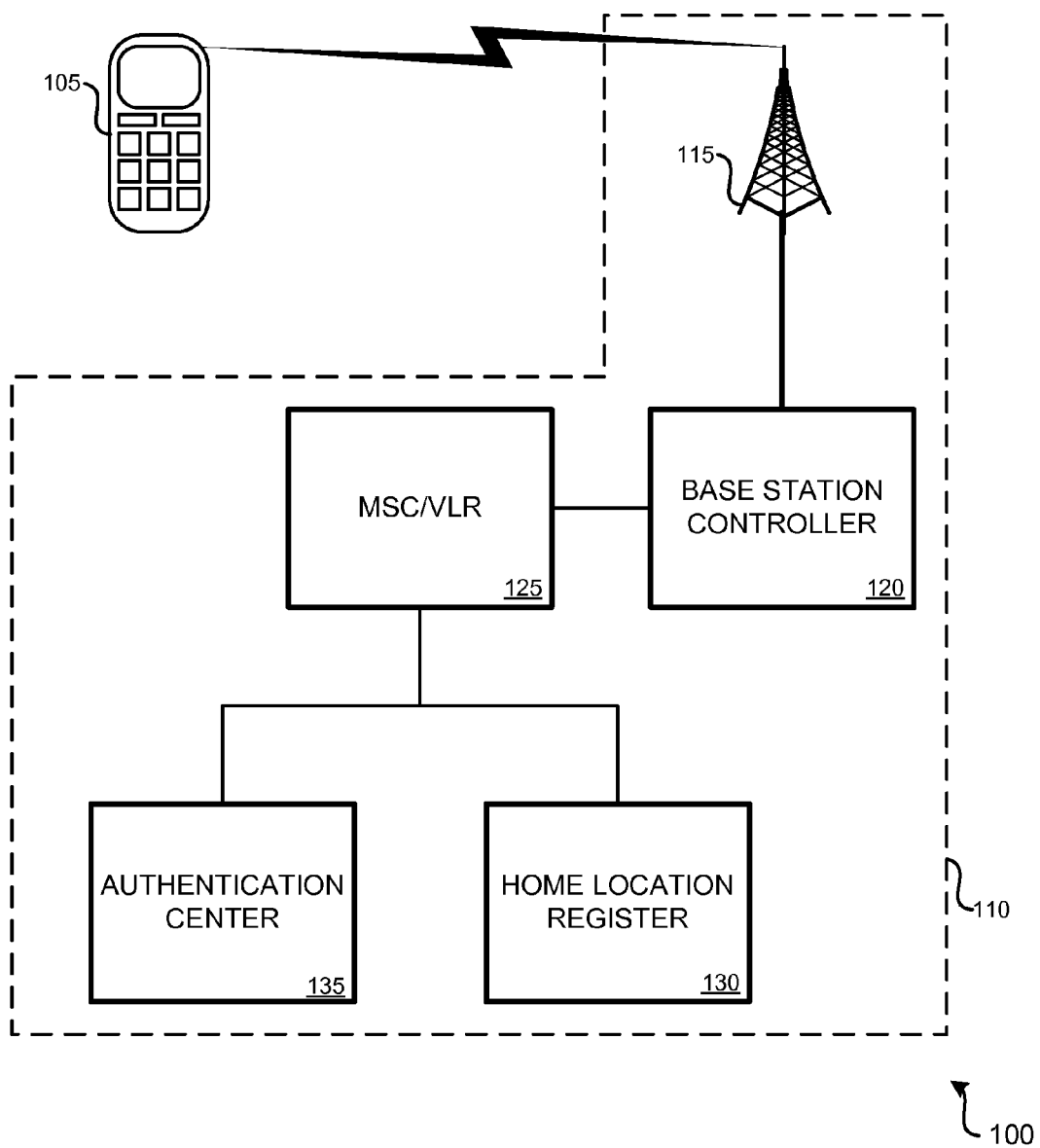
FIG. 1 illustrates an embodiment of a wireless device in communication with a wireless network.

Arrangements described herein allow a wireless device to act as the vehicle for its own activation in a wireless network. As used herein, the term "wireless device" is used to mean any type of device that operates by access to a wireless network and requires activation to be operable. Such devices include wireless phones, as well as connected personal digital assistants, portable email devices, and/or the like. In one aspect, such devices may operate on what is sometimes referred to as a "wide area cellular" network, including without limitation a Global System for Mobile telecommunications ("GSM") network, a code division multiple access ("CDMA") network, and/or networks operating in accordance with any derivatives thereof (such as General Packet Radio Service ("GPRS"), Enhanced Data rates for GSM Evolution ("EDGE"), CDMA2000, Universal Mobile Telecommunications Standard ("UMTS"), Code Wideband-CDMA ("W-CDMA"), High Speed Packet Access ("HPSA"), and Evolution-Data Optimized ("EVDO") technologies, among others).

SIM cards may be provided having stored thereon temporary IMSIs. These SIM cards may be sold with a wireless device. These temporary IMSIs may be within a range of IMSIs reserved for use by a detection device. In some embodiments, when a wireless network receives a message requesting to attach to the wireless network (a "registration message") from a wireless device assigned a temporary IMSI number, it may forward this message to a detection device (which may be part of the wireless network or may be operated by a third-party), which selects a temporary MSISDN number for the IMSI.

The detection device may permit or block activation of a wireless device based on the IMSI of the wireless device's SIM card. If the IMSI of the wireless device (that is, the IMSI of the SIM card of the wireless device) is listed in a blacklist that is accessible to the detection device, activation of the wireless device associated with the IMSI may be blocked. Such a blacklist may be maintained manually and/or automatically. An administrator may add and/or remove IMSIs to and from the blacklist. IMSIs may automatically be added to (and/or removed from) the blacklist based on one or more predefined rules. For example, if a wireless device associated with an IMSI attempts to transmit above a threshold number of messages within a period of time, the IMSI may be added to the blacklist.

The detection device, in accordance with some embodiments, may provide sufficient signaling support to allow the wireless network to register and manage the wireless device without causing an error to be displayed to the user of the wireless device, thereby possibly resulting in a more satisfying activation experience for the user. The detection device, upon receiving a registration message may be configured to compare the IMSI of the wireless device with a blacklist of IMSIs. If the IMSI of the wireless device is listed on the blacklist, activation may be blocked. If not, activation may be permitted to be attempted. In some embodiments, authentication may be conducted by the detection device without accessing an AUC. In some embodiments, during activation, rather than having a single AUC provisioned, two or more AUCs may be provisioned. The first AUC to complete the provisioning process may be transmitted authentication information linked with a wireless device being activated. By provisioning multiple AUCs, the latency during activation may be decreased because only one AUC may need to respond to the provisioning request and receive the authorization information.

A profile for the wireless device may be provided by the detection device to the wireless network (and/or more particularly, the appropriate equipment, such as a visitor location register (VLR) and/or visited mobile switching center (MSC)). This profile, which contains the temporary MSISDN number, provides the wireless device with sufficient access to the wireless network to complete the activation process. An MSISDN may refer to a dialable number that a caller may dial to communicate with a wireless device.

The detection device may be configured to notify an activation system that a wireless device with a temporary IMSI has registered with the network. The activation system, then, may assign a non-temporary MSISDN to the wireless device (based, perhaps, on an interaction between the user and the activation system) and/or may assign a non-temporary IMSI number to the SIM card in the wireless device. The activation system may also create, in the wireless network (e.g., home location registers, authentication centers, etc.) appropriate records comprising the non-temporary MSISDN and IMSI number. The temporary MSISDN then may be returned to the pool for re-use by the detection device in another activation procedure.

At the conclusion of activation, once the wireless device has been assigned a non-temporary (e.g., permanent) MSISDN and non-temporary (e.g., permanent) IMSI, the detection device may not automatically receive an indication of whether the activation process completed properly. For example, once the wireless device has received the non-temporary IMSI and the non-temporary MSISDN, the wireless device may reattach to the wireless network using the non-temporary IMSI and requests to the wireless network involving the wireless device may no longer be routed to the detection device (because the wireless device's IMSI is non-temporary). As such, in order to confirm that activation has occurred properly, a message, such as an SMS text message, may be registered for delivery to the wireless device by the detection device with an HLR. If the HLR responds to the detection device with a message indicating that the non-temporary MSISDN is available for receiving (SMS) messages, the detection device may determine that activation has been successful.

While the following systems and methods discuss the use of IMSIs, it should be understood that similar systems and method may be used with some other form of identifier and the description of IMSIs should not be interpreted as limiting.

FIG. 1 illustrates an embodiment 100 of a wireless device 105 in communication with a wireless network 110. Wireless network 110 may include a signaling system 7 ("SS7") network. In also may be possible for wireless network 110 to include one or more of a wireless intelligent network ("WIN"), a public switched telephone network ("PSTN"), and/or a data network (such as an Internet Protocol network, which can include the Internet, an Intranet, and/or the like). In embodiment 100 of FIG. 1, wireless network 110 comprises (and/or provides communication between) base station 115, base station controller (BSC) 120, a mobile switching center (MSC) 125, a home location register (HLR) 130, and an authentication center (AUC) 135. One skilled in the art will appreciate that wireless network 110 may include other components, such as a switching service point, intelligent peripheral, etc., and/or or that wireless network 110 often will comprise multiple base stations, base station controllers, mobile switching centers, home location registers and/or authentication centers. Likewise, it is possible that two or more of these components might be integrated in a single device.

Generally, wireless device 105 has associated therewith an identification number. The identification number may be specific to a wireless device or a SIM card of the wireless device. As such, the identification number, which may be an IMSI, may not be the same as another IMSI of another wireless device 105 configured to attach to wireless network 110. The IMSI may identify wireless device 105 to the network, and/or an addressing number (which may be, but need not necessarily be, an MSISDN), which may be used by wireless network 110 to address wireless device 105 when communicating with wireless device 105.

In normal operation, when an activated wireless device 105 registers with wireless network 110 (e.g., wireless device 105 is powered on, enters the service area, etc.), it sends a message, which is received at the base station controller 120 (usually via the base station 115). The message generally will include the IMSI of the SIM card of wireless device 105, either explicitly or implicitly (e.g., the base station controller 120 will be able to ascertain the identification number and associate it with the message, if necessary). (For simplicity, this phrase may be abbreviated to "the IMSI of wireless device 105," which should be interpreted to include the IMSI of the SIM card of a wireless device.) The MSC 125 (or some other component of wireless network 110) thus identifies the identification number of the wireless device 105 and queries the HLR 130, which returns to the MSC 125 data about the wireless device 105. (While this document, for ease of description, refers to communications between the MSC 125 and other devices, one skilled in the art will appreciate that, in practice, it is often either a visitor location register ("VLR"), which, in many cases, is collocated with the MSC 125, the MSC 125 itself and/or some combination thereof, that participates in such communications. Hence, this document sometimes refers to the MSC and VLR collectively, and references herein to operations involving the MSC 125 should be considered to include operations that might involve a VLR as well.) Such data can include the addressing number of wireless device 105, as well as the capabilities of wireless device 105.

Typically, a security key is used to secure communications between wireless device 105 and the wireless network 110. This security key (often implemented as a set of data "triplets" comprising a signed response, session key and a random number) is generated by the authentication center 135, based on a shared secret stored in the wireless device (often referred to as Ki) and in a record in the authentication center 135. In a typical implementation, the HLR 130 forwards the query (or at least the wireless device's identification number) to the authentication center 135 as well. The authentication center 135 correlates the wireless device's identification number with the shared secret, such that when provided the identification number, the authentication center 135 can generate the security key based on the shared secret for that wireless device and return it to the MSC 125, which can use that data to authenticate the wireless device 105.

Once the MSC 125 has obtained the data from the HLR 130 and authenticated wireless device 105 based on the security key, wireless device 105 is operable on wireless network 110. In this typical implementation, however, the activation process populates HLR 130 and authentication center 135 with data about wireless device 105, including the identification number and shared secret. Hence, if wireless device 105 has not been activated, neither HLR 130 nor authentication center 135 may contain records corresponding to the identification number of wireless device 105, thereby preventing wireless device 105 from registering with wireless network 110 and thus rendering wireless device 105 at least partially inoperable on wireless network 110.

Figure 2:
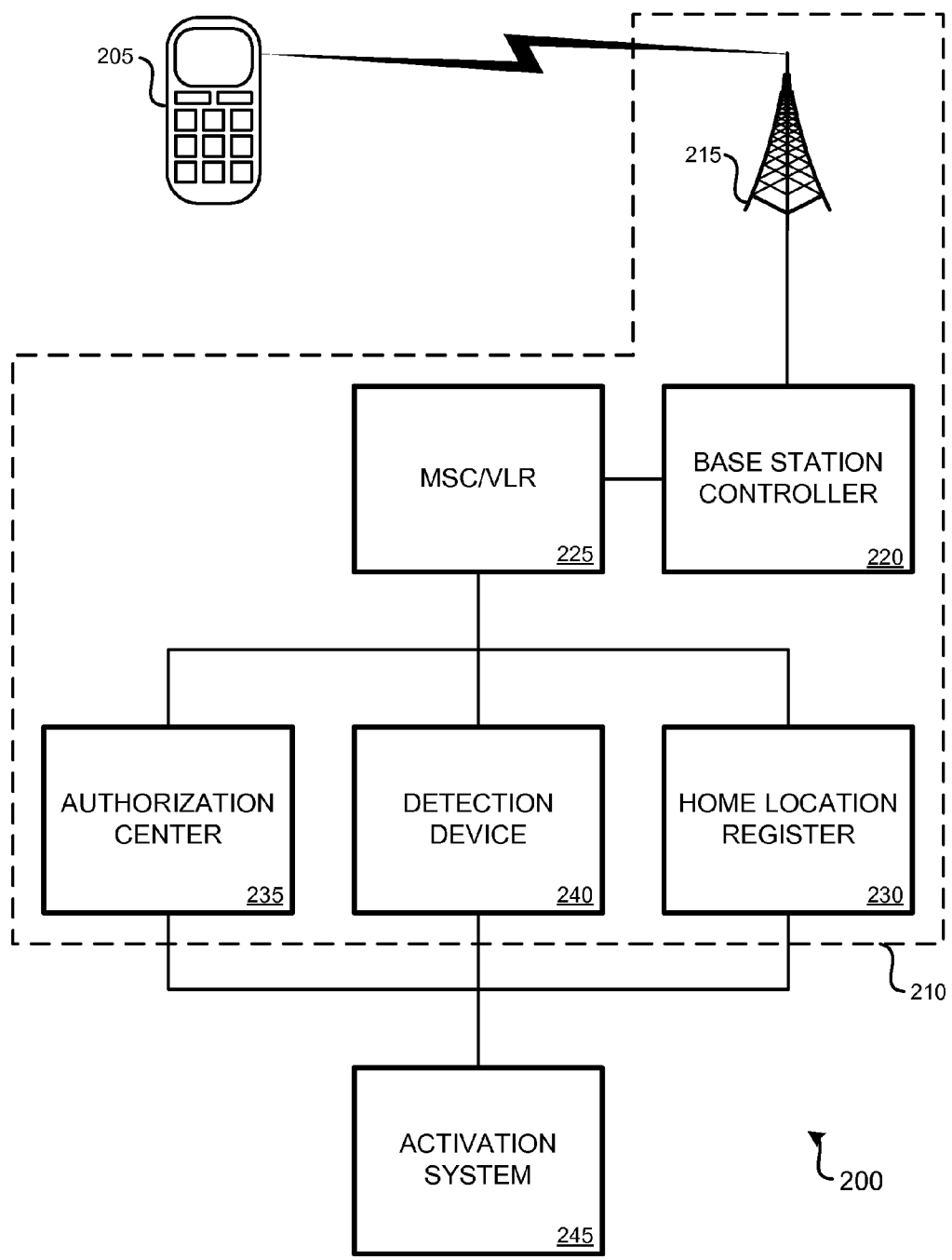
FIG. 2 illustrates an embodiment of a wireless network configured to activate a wireless device.

FIG. 2 illustrates an embodiment 200 of a wireless network 210 configured to activate wireless device 205. Embodiment 200 is similar to embodiment 100 of FIG. 1, and it may operate in similar fashion once wireless device 205 has been activated. Embodiment 200, however, is configured to allow wireless device 205 to perform its own activation. In accordance with a set of embodiments, in addition to base station 215, BSC 220, MSC/VLR 225, HLR 230 and AUC 135, embodiment 200 includes a detection device 240 and an activation system 245. Detection device 240 can be a device and/or computer system that is configured to perform functions ascribed herein to a detection device. In some cases, detection device 240 may be implemented by a modified HLR; in other cases, detection device 240 may perform only detection services. Activation system 245 can be any computer system and/or device that comprises the necessary configuration and/or software to perform the functions described below to activate the wireless device 205 through wireless network 210. In some embodiments, activation system 245 is a single computer; in other embodiments, it may be a group of computers that collectively provide the functionality described herein.

In the illustrated embodiment, detection device 240 resides within wireless network 210, while the activation system 245 is outside wireless network 210, although activation system 245 is in communication (either directly or indirectly) with detection device 240, as well as the HLR 230, AUC 235 and/or MSC/VLR 225. (In various other arrangements, detection device 240 and/or activation system 245 may be either inside or outside wireless network 210 and/or may be in communication, either through wireless network 210 or otherwise, with various components of the network.)

A mode of operation of embodiment 200, and, in particular, detection device 240 and activation system 245, is described in detail below. In a general sense, however, a set of embodiments provides a detection device that is configured to act as a "quasi-HLR." In other words, the detection device (which is not an HLR 130 and generally does not perform the functions of an HLR 130), is configured to be seen by wireless network 210—and, in particular the MSC 225—as the HLR for an unactivated wireless device 205. Hence, when unactivated wireless device 205 attempts to register with wireless network 210, MSC/VLR 225 queries detection device 240, rather than HLR 230, for data about wireless device 205. MSC/VLR 225 may query detection device 240 instead of HLR 230 based on a temporary IMSI of wireless device 205. For example, IMSIs in a particular range may be configured for routing to detection device 240. Detection device 240, in turn, may contact activation system 245, which is responsible for assigning an addressing number to wireless device 205 and, in some cases, assigning a new, non-temporary (e.g., permanent) identification number (e.g., IMSI) to the SIM in wireless device 205. (In which case, the original, temporary identification number may be reused on a different unactivated SIM in the future.) In an aspect, activation system 245 may be responsible for updating wireless network 210 to complete activation of wireless device 205, as described in further detail below.

Figure 3:
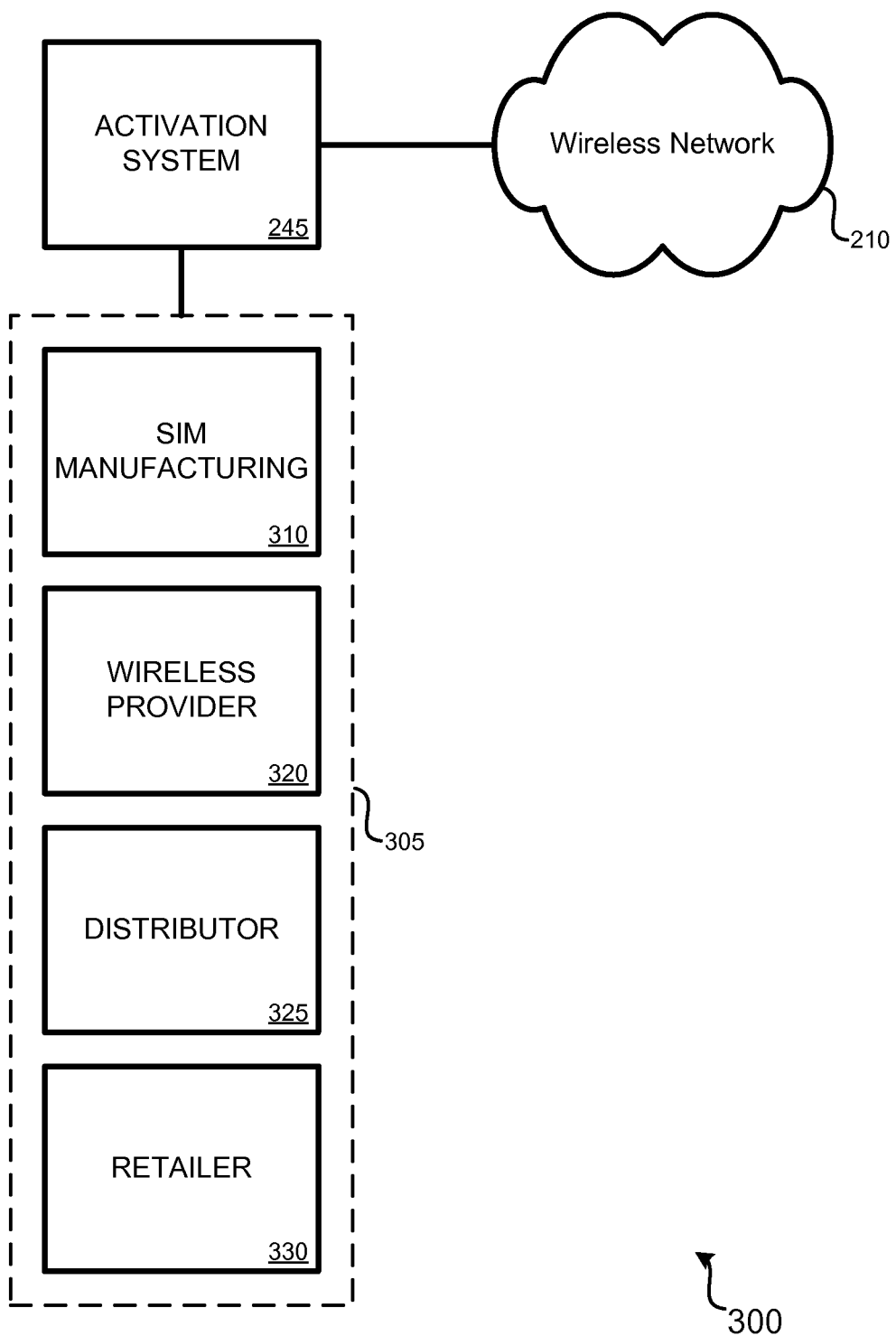
FIG. 3 illustrates an embodiment of a relationship between a device activation provider and a supply chain, in accordance with various embodiments of the invention.

In some embodiments, such activation techniques form the basis for a method of manufacturing and/or distributing SIMs (or just IMSIs) more efficiently, and/or to monetize the number selection process. FIG. 3 illustrates an embodiment 300 of a relationship between activation system 245 and a supply chain (which might also be considered a sales channel) 305. Supply chain 305 may involve various numbers of entities; as illustrated, supply chain 305 includes SIM manufacturing process 310, wireless provider 320, distributor 325, and retailer 330. A retailer can be any of a variety of entities, with a variety of relationships to a wireless provider 320. For example, in some cases, retailer 330 might be a value-added reseller of wireless devices, while in other cases, retailer 330 might be a big-box electronic store. In some cases, the retailer might be a general merchandise retailer (such as a grocery store, convenience store, kiosk, etc.). Unlike some traditional activation techniques, embodiments of the invention can support retail sales through virtually any type of retailer.

In various embodiments, supply chain 305 may contain none, one, or more of each of these types of entities. For example, in a case in which activation system 245 is operated by the wireless provider (i.e., the wireless telephone company will provide service for the wireless device once activated), the wireless provider might not be considered part of the supply chain. As another example, if the wireless devices/SIMs are rebranded before sale to the end user, there may be multiple wireless providers 320 in the supply chain. (It should be noted as well that any two or more of these entities may be consolidated; for example, wireless provider 320 may also act as distributor 325 and/or retailer 330 of wireless devices.)

In the illustrated embodiment, SIM manufacturer 310 is at the beginning of the supply chain (although the activation provider might actually be considered the beginning of the supply chain). SIM manufacturer 310 is responsible for manufacturing SIMs and/or, more precisely, for encoding the SIMS with identification numbers provided by activation system 245.

The SIMs then can be provided to wireless provider 320, which distributes them to distributor(s) 325 (and/or directly to retailer(s) 330), either installed in wireless devices or as standalone components to be installed later into wireless devices.

Retailer 330, after receiving a SIM/wireless device, sells the wireless device to a user, who can then activate the wireless device as described herein.

As noted above, activation system 245 (which might be operated by an activation provider, who may be a standalone entity and/or one of the other entities within the supply chain 305, such as the wireless provider 320 and/or SIM manufacturer 310) may be configured to be in communication with one or more other entities in the supply chain. In an aspect, activation system 245 might be in communication with these entities through conventional computer communications (such as by way of a business application, such as a supply chain management application, via specialized software, via a specified data exchange format, such as XML, via human communication, etc.).

Activation system 245, in an aspect, interacts with the SIM manufacturing process to provide a pool of known identification numbers (e.g., IMSI numbers) that can be encoded onto SIMs as temporary identification numbers of unactivated SIMs. SIM manufacturer 310 can then produce SIMs, in conventional fashion, encoded with identification numbers from this pool.

Activation system 245 may also interact with the wireless provider (in addition to interacting with the provider's wireless network to activate wireless devices, as described elsewhere herein) to provide status information about the activation process, for example, by notifying wireless provider 320 of the wireless network of the status of SIMs/identification numbers. Activation system 245 may interact as well with distributors 325 and/or retailers 330 to provide such information, to obtain information about sales of SIMs (and/or devices comprising the SIMs), particularly SIMs having temporary identification numbers.

Activation system 245 (and/or another computer in communication therewith) may track the progress of the SIM through the supply chain/sales channel, either to maintain information about the status of the IMSIs and to prevent supply chain leakage, and/or to identify an entity responsible for the IMSI. For example, if an IMSI is used in a rebranded wireless device, it can be useful to know the provider of the rebranded service, as there may be a need to apportion fees and/or account for transaction costs associated with the sale of the wireless device. In one aspect, activation system 245 (and/or an associated computer) may receive status updates when the status of an IMSI changes, including, for example, when a SIM is encoded with the IMSI, when the SIM is installed in a device, when the device is provided to a distributor 325 and/or retailer 330, when the device is purchased by an end user, etc. Such updates may be provided by the entity responsible for the status of the IMSI at that time and/or may be propagated up the supply chain to the activation system (or associated computer). Standard supply chain and/or sales channel management techniques, communications techniques, and/or software may be used to communicate such information.

In another aspect, activation system 245 (and/or another aspect of the activation provider) may interact with entities in the supply chain to transfer payments in relation to the activation process. In some embodiments, for example, the activation provider may receive payment from wireless provider 320 (and/or any of the other entities) for providing activation services. In other embodiments, the activation provider may also make payments to any of these entities, and/or may notify the entities of such payments, amounts owing, etc., via activation system 245 and/or another system in communication therewith. Merely by way of example, as described below, in some cases, a user will be charged a fee for the ability to have input into the selection. That fee may be charged by the activation provider, and/or a portion of the fee may be allocated to SIM manufacturer 310, wireless provider 320, distributor(s) 325, and/or retailer(s) 330. Payment of these portions of the fees, and/or accounting therefor, may be performed by activation system 245 (and/or another computer in communication therewith). In other cases, the fee may be charged by wireless provider 320 (or another entity) directly, for example, by adding the fee to the user's invoice for wireless service. In such cases, activation system 245 might notify that entity of the type of input (as described below, for example) provided by the user in selecting the number (e.g., MSISDN) for the wireless device, so that wireless provider 320 (or other entity) can properly bill the user. Some of that fee might be allocated to the activation provider as well.

Figure 4:
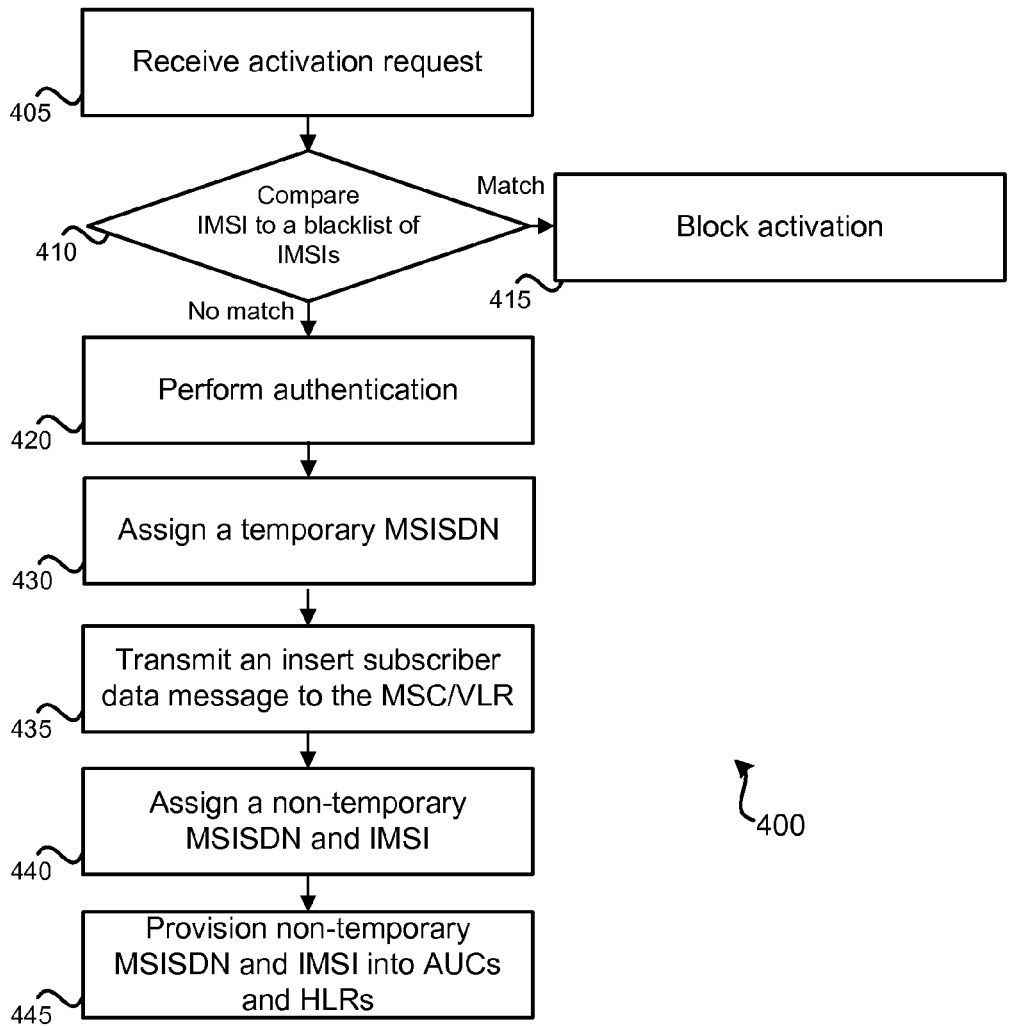
FIG. 4 illustrates an embodiment of a method for activating a wireless device.

FIG. 4 illustrates an embodiment of a method 400 for activating a wireless device using a detection device. Method 400 may be performed using wireless network 210 of FIG. 2. Method 400 may also be performed by some other wireless network that has, or is in communication with, a detection device, such as detection device 240 of FIG. 2. Each step of method 400 may be performed by such a detection device, which may comprise one or more computer systems, such as computer system 900 of FIG. 9. The detection device may be part of the wireless network or may be in communication with the wireless network but operated by a third-party. Means to perform method 400 may include one or more computerized devices, such as the components of the previously detailed systems.

At step 405, a detection device may receive an authentication request. The authentication request may be in the form of a "send authentication information" message received from an MSC (and/or VLR) that services the wireless device. The authentication request may result from a wireless device initially attempting to attach to a wireless network, such as wireless network 210 of FIG. 2. The authentication request may be routed to the detection device based on the IMSI of the wireless device. This IMSI may be a temporary IMSI. All requests from wireless devices associated with such temporary IMSIs may be routed by the wireless network to the detection device. For example, a range of IMSIs may be routed by the wireless network to the detection device. The authentication request may contain the IMSI of the wireless device attempting to attach to the wireless network.

At step 410, the IMSI received as part of the authentication request at step 405 may be compared to a blacklist of IMSIs. Such a blacklist may list one or more IMSIs that are prohibited from being activated for use on the wireless network. As an example, IMSIs of wireless devices that are known to be stolen may be added to the blacklist. The creation and modification of such a blacklist is described in detail in reference to method 700 of FIG. 7.

If the IMSI received as part of the authentication request matches an IMSI listed in the blacklist, method 400 may proceed to step 415. At step 415, authentication, and thus activation of the wireless device, may be blocked by the detection device. As such, the wireless device may not be activated for one or more uses on the wireless network. The detection device may return one or more messages to the MSC/VLR that indicates that authentication of the wireless device associated with the IMSI is prohibited. The detection device returning such messages to the MSC/VLR may not require any interaction with an AUC and/or an HLR to deny authentication.

If the IMSI received as part of the authentication request does not match an IMSI listed in the blacklist, method 400 may proceed to step 420. By the IMSI received as part of the authentication request at step 405 not being present on the blacklist, it may be determined that the wireless device associated with the IMSI (or the SIM associated with the IMSI) is eligible for activation. While at step 410 the IMSI received as part of the authentication request is compared to a blacklist of IMSIs, it should be understood that a similar comparison may be conducted to a whitelist of IMSIs. In such a comparison, activation of the IMSI received as part of the authentication request at step 405 may only be permitted if the received IMSI is listed on the whitelist. Activation may be blocked if the IMSI is not listed on the whitelist.

At step 420, authentication of the IMSI received by the detection device at step 405 may be performed by the detection device. As such, it may be possible for authentication to be performed by the detection device without interaction with an AUC or HLR. The detection device may return one or more messages to the MSC/VLR that indicates the result of the authentication procedure. This authentication performed by the detection device may involve using the encrypted Ki values (or some other encryption values) associated with the temporary IMSI received as part of the authentication request. The detection device may receive one or more location update messages from the MSC/CLR associated with the wireless device being activated.

At step 430, a temporary MSISDN may be selected from a pool of available MSISDNs and assigned to the temporary IMSI of the wireless device. As such, the wireless device being activated is now associated with a temporary MSISDN. This temporary MSISDN may only be used during activation. As such, once the temporary MSISDN has been used during activation, the temporary MSISDN may be used for activation of another wireless device. At step, 435 an insert subscriber data message may be transmitted to the MSC/VLR. This message may identify various services that the wireless device is capable of, such as receiving and/or sending SMS messages, emergency services, placing and/or receiving phone calls, and/or web services. Following step 435, the wireless device may be permitted to use the wireless network for the bearer services that were identified in the insert subscriber data message.

At step 440, a non-temporary IMSI and a non-temporary MSISDN may be assigned to the wireless device by the detection device. The non-temporary MSISDN may be selected from a pool of non-temporary MSISDNs available for assignment. In some embodiments, a user of the wireless device may be permitted to select a non-temporary MSISDN from the pool. For example, referring to U.S. patent application Ser. No. 12/197,396 identified in the cross reference section, method 700 of FIG. 7 may be performed to permit a user of the wireless device to select a non-temporary MSISDN.

At step 445, the non-temporary IMSI may be provisioned into one or more AUCs of the wireless network. Additionally, at step 445, the non-temporary IMSI and the non-temporary MSISDN may be provisioned into one or more home location registers. As such, in method 400, one or more of the AUCs may be contacted once authentication of the wireless device and the temporary IMSI has been completed. In some embodiments, as described in relation to method 500, authentication may be performed using one or more AUCs.

Following step 445, a confirmation process may be conducted by the detection device to ensure that the wireless device has been activated properly for use with the non-temporary IMSI and the non-temporary MSISDN. This confirmation process may follow method 800 of FIG. 8.

Figure 5:
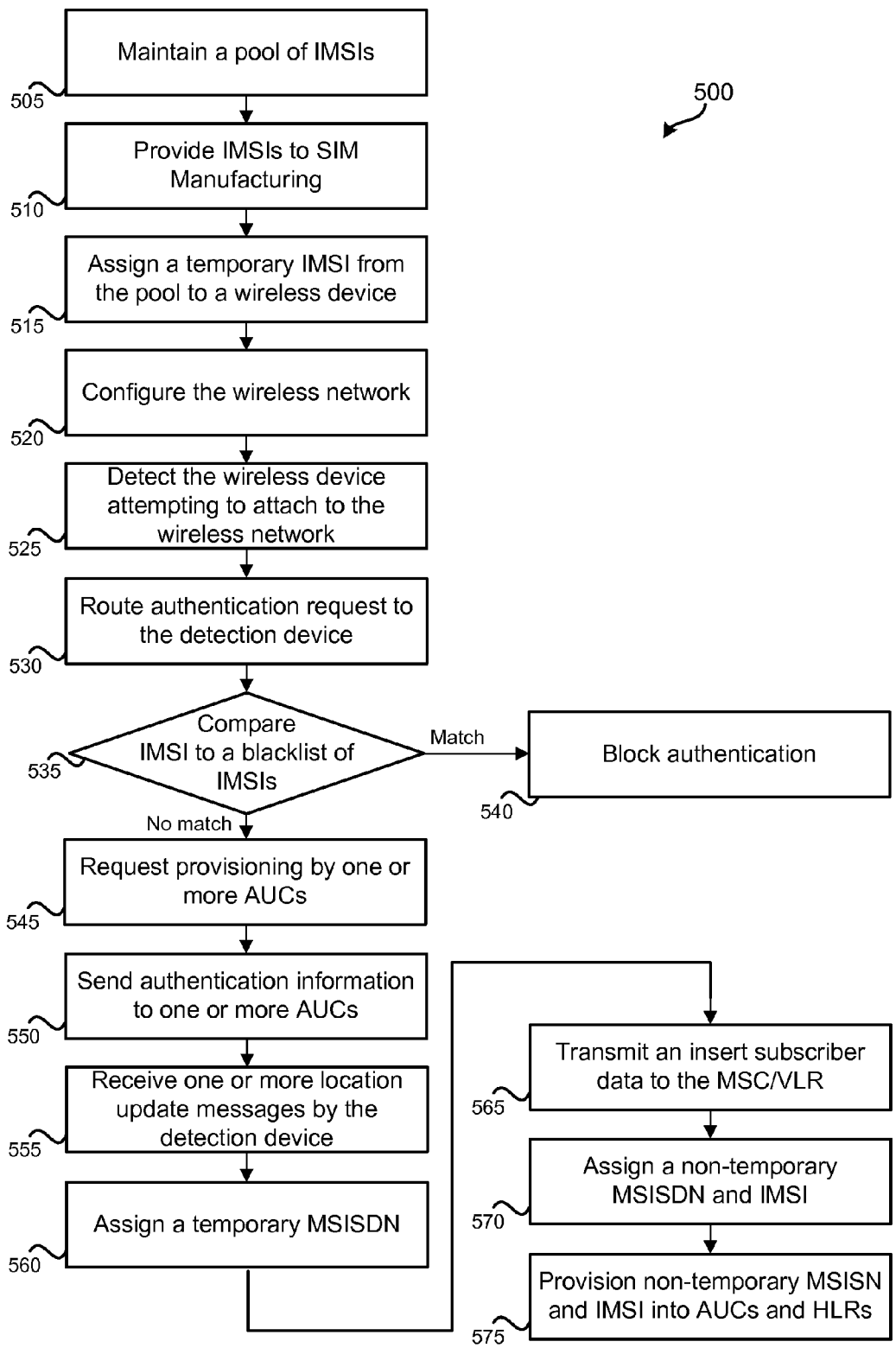
FIG. 5 illustrates another embodiment of a method for activating the wireless device.

FIG. 5 illustrates another embodiment of a method for activating a wireless device. Method 500 may be performed using wireless network 210 of FIG. 2. Method 500 may also be performed by some other wireless network that has, or is in communication with, a detection device, such as detection device 240 of FIG. 2. Each step of method 500 may be performed by a computer system, which may comprise one or more computers, such as computer system 900 of FIG. 9. The detection device may be part of the wireless network or may be in communication with the wireless network but operated by a third-party. Method 500 may represent an alternate embodiment of method 400. Various means may be used to perform the steps of method 500, such as: a detection device, components of a wireless network, an activation system (which may or may not be part of the wireless network), and/or other various computerized devices may be used.

In accordance with method 500, at step 505, a pool of IMSIs (or other form of identifiers) is maintained, for example, at the activation system. The pool might, but need not, comprise consecutively-numbered IMSIs. Each of the IMSIs in this pool is known to the activation system, and they are designated by the activation system for use as temporary IMSIs. (The activation system might also maintain another pool of IMSIs to be used as non-temporary IMSIs, as described in more detail below.) Maintaining a pool of IMSIs can comprise storing the IMSIs in a database accessible to the activation system, keeping a record of the IMSIs, removing used IMSIs from the pool, adding IMSIs to the pool when necessary, and/or the like.

The temporary IMSIs in the pool may be provided to SIM manufacturing at step 510, which manufactures SIMs encoded with these temporary IMSIs and/or otherwise provides for each of the temporary IMSIs to be encoded and/or stored on a SIM. Each temporary IMSI is thereafter assigned to a SIM card for use in a wireless device at step 515, for example, by installing a SIM encoded with the temporary IMSI into the wireless device and/or otherwise packaging the SIM with the wireless device. In an aspect, providing the temporary IMSI to be encoded on a SIM, the activation system reserves this temporary IMSI from the pool of available IMSI numbers, so that it cannot be used again at least until recycled.

At step 520, the wireless network may be configured to accommodate the activation process. One method of configuring the wireless network is described in further detail below with respect to method 600 of FIG. 6. At step 525, a wireless device communicatively coupled with a SIM with one of the temporary IMSIs is detected by the wireless network. For example, this may occur when the wireless device enters a service area of the wireless network or is turned on while within a service area of the wireless network.

At step 530, a detection device may receive an authentication request. This authentication request may be routed to the detection device by the wireless network. The authentication request may be in the form of a "send authentication information" message received from an MSC (and/or VLR) in communication with the wireless device. The authentication request may result from the wireless device initially attempting to attach to a wireless network at step 525, such as wireless network 210 of FIG. 2. The authentication request may be routed to the detection device based on the temporary IMSI of the wireless device. All requests from such temporary IMSIs may be routed by the wireless network to the detection device. For example, a range of IMSIs designated as temporary may be routed by the wireless network to the detection device. The authentication request may contain the IMSI of the wireless device attempting to attach to the wireless network.

At step 535, the IMSI received as part of the authentication request at step 530 may be compared to a blacklist of IMSIs by the detection device. Such a blacklist may list one or more IMSIs that are prohibited from being activated for use on the wireless network. As an example, IMSIs of SIM cards that are known to be stolen may be listed on the blacklist. As such, stolen prepaid phones may be prevented from being activated for use on the wireless network. The creation and modification of such a blacklist is described in more detail in reference to method 700 of FIG. 7.

If the IMSI received as part of the authentication request matches an IMSI listed in the blacklist, method 500 may proceed to step 540. At step 540, authentication, and thus activation of the wireless device, may be blocked by the detection device. As such, the wireless device may not be activated for one or more uses on the wireless network. For example, incoming and outgoing calls, text messages, and internet access may be blocked. Some services, such as emergency services, may be enabled. The detection device may return one or more messages to the MSC/VLR that indicates that authentication of the wireless device associated with the IMSI is prohibited (such as "No AUC entry"). The detection device returning such messages to the MSC/VLR may not require any interaction with an AUC and/or an HLR.

If the IMSI received as part of the authentication request does not match an IMSI listed in the blacklist, method 500 may proceed to step 545. By the IMSI received as part of the authentication request at step 530 not being present on the blacklist, it may be determined that the IMSI (and, thus, the associated wireless device) is eligible for activation. While at step 530 the IMSI received as part of the authentication request by the detection device is compared to a blacklist of IMSIs, it should be understood that a similar comparison may be conducted to a whitelist of IMSIs. In such a comparison, activation of the IMSI received as part of the authentication request at step 530 may only be permitted if the received IMSI is affirmatively listed on the whitelist. Activation may be blocked if the IMSI is not listed on the whitelist.

While in method 400 activation was conducted between the detection device and the MSC/VLR without interaction with an AUC and/or HLR, in some embodiments one or more AUCs may be used for authentication. In method 500, AUCs are used for authentication. However, in some embodiments, method 500 may be performed with an authentication scheme similar to method 400. At step 545, the detection device may request provisioning with one or more AUCs. This may involve one or more AUC entries being made for the temporary IMSI associated with the wireless device in one or more AUCs. Before transmitting the authentication information to an AUC, the detection device may wait for a response indicating that provisioning has been completed.

At step 550, the authentication information may be transmitted to the first AUC that completes provisioning. For example, at step 545, the provisioning request may have been transmitted to multiple AUCs. However, only one of these provisioning requests may need to be completed successfully in order to continue with the method 500. As such, preference may be given to the first AUC to respond to the provisioning request. As such, latency in completing the activation process may be decreased. At step 550, the fastest AUC to respond to the provisioning request of step 545 may receive the authentication information. Therefore, the AUC with the fastest response time to the provisioning request may be selected to be used for authentication. If one or more of the AUCs has been pre-provisioned, step 550 may be performed following step 535 by transmitting the authentication information to multiple AUCs. At step 550, authentication may be performed by comparing the Ki values from the SIM card against those specified by the SIM card manufacturer, which may already be stored in the AUC. In some embodiments, the Ki values on the SIM card may be transmitted to multiple AUCs. As such, if one AUC responded to the provisioning request faster, the authentication process can be completed sooner, thereby decreasing latency in activating the wireless device. If a timeout response is received from an AUC, the authentication information may be sent to a different AUC.

At step 555, one or more location update messages may be received by the detection device. These locations update messages may be received from the appropriate MSC/VLR and may have been routed to the detection device based on the temporary IMSI. An entry may be added to the VLR for the wireless device.

At step 560, a temporary MSISDN may be selected from a pool of available MSISDNs and assigned to the temporary IMSI of the wireless device. As such, the wireless device being activated is now associated with a temporary MSISDN. This temporary MSISDN may be used only during activation. As such, once the temporary MSISDNs have been used during activation, the temporary MSISDN may be used for activation of another wireless device.

At step 565, an insert subscriber data message may be transmitted to the appropriate MSC/VLR servicing the wireless device. This message may identify various services that the wireless device is capable of, such as receiving and/or sending SMS messages, emergency services, placing and/or receiving phone calls, and/or web services. Following step 565, the wireless device may be permitted to use the wireless network for the bearer services that were identified in the insert subscriber data message.

At step 570, a non-temporary IMSI and a non-temporary MSISDN may be assigned to the wireless device by the detection device. The non-temporary MSISDN and the non-temporary IMSI may be selected from a pool of non-temporary MSISDNs and a pool of non-temporary IMSIs, respectively, available for assignment. In some embodiments, a user of the wireless device may be permitted to select a non-temporary MSISDN. For example, referring to U.S. patent application Ser. No. 12/197,396 identified in the cross reference section, method 700 of FIG. 7 may be performed to permit a user of the wireless device to select a non-temporary MSISDN.

At step 575, the non-temporary IMSI may be provisioned into one or more AUCs of the wireless network. Additionally, at step 575, the non-temporary IMSI and the non-temporary MSISDN may be provisioned into one or more home location registers (HLRs). Following the wireless device (more specifically, the SIM card of the wireless device) being assigned a non-temporary IMSI and a non-temporary MSISDN, the temporary IMSI and the temporary MSISDN previously used may be available for activation by another wireless device. For example, the temporary IMSI may be reassigned into another pool of IMSIs that are to be provided to SIM manufacturing. The temporary MSISDN may be assigned to another wireless device for use during the activation process.

Following step 575, a confirmation process may be conducted by the detection device to ensure that the wireless device has been activated properly for use with the non-temporary IMSI and the non-temporary MSISDN. This confirmation process may follow method 800 of FIG. 8.

Figure 6:
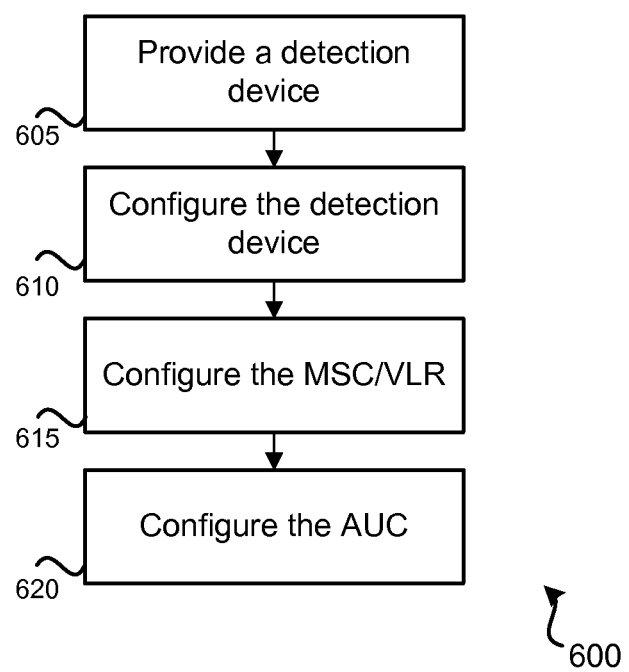
FIG. 6 illustrates an embodiment of a method of configuring a wireless network to support wireless device activation.

FIG. 6 illustrates an embodiment of a method 600 of configuring a wireless network to support wireless device activation. Method 600 can be implemented as part of method 400, method 500, or as part of some method for performing wireless device activation. Method 600 may be performed using wireless network 210 of FIG. 2. Method 600 may also be performed by some other wireless network that has, or is in communication with, a detection device, such as detection device 240 of FIG. 2. Each step of method 600 may be performed by a computer system, which may comprise one or more computers, such as computer system 900 of FIG. 9. Means to perform method 600 may include one or more computerized devices, such as the components of the previously detailed systems.

The method 600 comprises providing a detection device at step 605. Providing a detection device might comprise installing the detection device in a wireless provider's wireless network. Providing a detection device might comprise configuring the detection device at step 610. Configuration of the detection device can include establishing communication between the detection device and other components in the wireless network, establishing communication between the detection device and the activation system, and/or the like. In an aspect, configuring the detection device can also comprise storing in the detection device a pool of temporary MSISDNs that can be used for the activation process, and/or installing, on the detection device, code (e.g., hardware, firmware and/or software instructions) that implements the functionality described herein. Such a pool of temporary MSISDNs may be stored within a database accessible by the detection device.

Method 600 may comprise configuring specific components of the wireless network to operate in accordance with embodiments of the invention. Specifically, in some cases, an MSC and/or VLR (and/or any other necessary component within the wireless network) is configured to treat the detection device as the HLR for any IMSI that falls within the pool maintained by the activation system at step 615. Hence, when an unactivated wireless device (which has assigned a temporary IMSI) attempts to register with the network, the wireless network will route data related to the wireless device to the detection device, as opposed to the conventional HLR (which, at that point will be unaware of the wireless device, since the wireless device has not been activated).

Configuration of the wireless network can also include configuration of the one or more authentication centers at step 620. Configuration of an authentication center includes, in one aspect, populating the authentication center with security keys for wireless devices identified by the temporary IMSIs (that is, creating records in the authentication center that correlate temporary IMSIs with the shared secrets stored on the SIMs encoded with those temporary IMSIs; these shared secrets then can be used to generate the necessary security keys for the wireless devices, as described above). This process may be similar to the configuration of an authentication center under a traditional activation process, except that the temporary IMSI is used instead of a non-temporary IMSI. These configuration operations, in an embodiment, can be performed automatically (and/or based on user input) by the activation system. In another embodiment, this configuration is performed manually.

Figure 7:
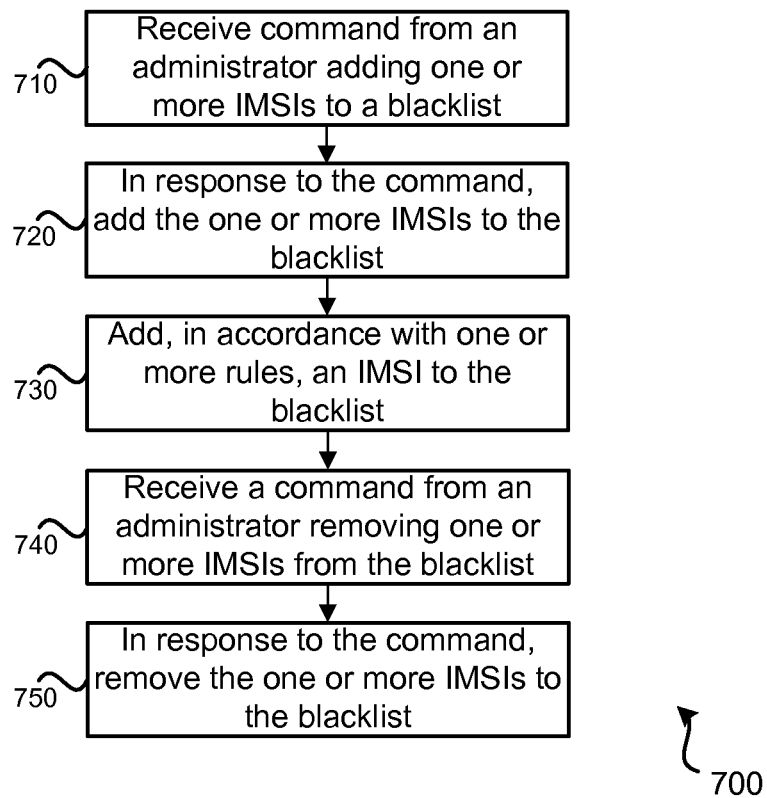
FIG. 7 illustrates an embodiment of a method for modifying an IMSI blacklist.

FIG. 7 illustrates an embodiment of a method 700 for modifying an IMSI blacklist. Method 700 may be performed in conjunction with wireless network 210 of FIG. 2. Method 700 may also be performed by some other wireless network that has, or is in communication with, a detection device, such as detection device 240 of FIG. 2. Each step of method 700 may performed by such a detection device, which may comprise one or more computer systems, such as computer system 900 of FIG. 9. The detection device may be part of the wireless network or may be in communication with the wireless network but operated by a third-party. Each step of method 700 may be performed by a detection device. Various means for performing method 700 include a detection device, which may include one or more computer systems. Means to perform method 700 may include one or more computerized devices, such as the components of the previously detailed systems.

At step 710, a command may be received from an administrator to add one or more IMSIs to a blacklist. For example, at step 710 if one or more wireless devices and/or SIM cards were stolen, IMSIs associated with those wireless devices and/or SIM cards may be blocked from having access to a wireless network by being added to the blacklist. The IMSIs of the blacklist may be temporary IMSIs. At step 720, in response to the command received at step 710, the one or more IMSIs received from the administrator may be added to the blacklist.

At step 730, one or more IMSIs may be added automatically to the blacklist without receiving a command directly from the administrator. For example, based on violation of one or more predetermined rules, an IMSI may automatically be added to the blacklist. At step 730, in accordance with one or more rules, an IMSI may be added to the blacklist. As an example, if a wireless device that corresponds with an IMSI attempts to send a number of signaling messages over a predefined threshold number, it may be determined that this IMSI should be added to the blacklist. Other rules may be possible for determining whether an IMSI should be added to the blacklist.

It may also be possible to manually remove IMSIs from the blacklist. At step 740, a command may be received from the administrator to remove one or more IMSIs from the blacklist. At step 750, in response to the command received at step 740, the one or more IMSIs specified may be removed from the blacklist.

While method 700 details the use of a blacklist, it should be understood that a whitelist may be used instead. In a whitelist, rather than adding IMSIs that are to be blocked to the list, IMSIs that are to be permitted to be activated may be added to the whitelist. As such, if an IMSI is to be blocked from being activated, the IMSI may be removed from the whitelist. Further, it should be understood that the steps of method 700 may be performed in varying orders. For example, the administrator may remove one or more IMSIs from the blacklist without adding other IMSIs to the blacklist first.

Figure 8:
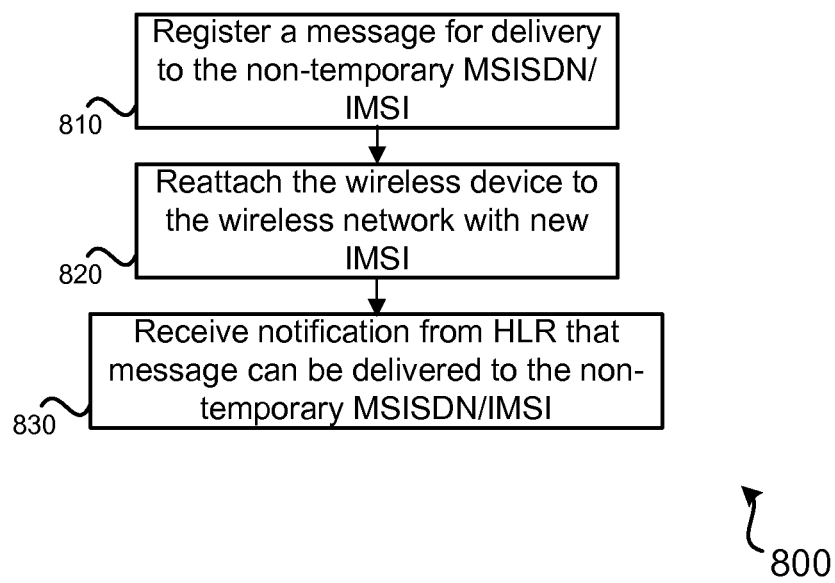
FIG. 8 illustrates an embodiment of a method for confirming that a wireless device has been activated properly.

After a non-temporary IMSI and a non-temporary MSISDN have been assigned to a wireless device, data received from the wireless device may no longer be routed to the detection device. This may be because the wireless network is configured to only route data related to temporary IMSIs (e.g., a particular range of IMSIs) to the detection device. Accordingly, once the wireless device has been assigned the non-temporary IMSI and the non-temporary MSISDN, the detection device may not be able to directly confirm whether the wireless device has successfully attached to the wireless network using the non-temporary IMSI (and the non-temporary MSISDN). As such, a method, such as method 800 of FIG. 8, may be used to perform such a confirmation. FIG. 8 illustrates an embodiment of a method for confirming that a wireless device has been activated properly by attaching to the wireless network using the non-temporary IMSI. Method 800 may be performed using wireless network 210 of FIG. 2. Method 800 may also be performed by some other wireless network that has, or is in communication with, a detection device, such as detection device 240 of FIG. 2. Each step of method 800 may be performed by one or more computer systems, such as computer system 900 of FIG. 9. The detection device may be part of the wireless network or may be in communication with the wireless network but operated by a third-party. Method 800 may be performed following method 400 of FIG. 4, method 500 of FIG. 5, and/or some other method for activating a wireless device. Each step of method 800 may be performed by a detection device, unless otherwise indicated. Means to perform method 800 may include one or more computerized devices, such as the components of the previously detailed systems.

At step 810, a message for delivery to the wireless device that is now associated with the non-temporary IMSI and non-temporary MSISDN may be registered by the detection device. This message may be transmitted to and registered with an HLR. The message may be an SMS text message. Other forms of messages besides SMS may also be possible.

At step 820, the wireless device may update with the non-temporary IMSI. Updating with the non-temporary IMSI may involve the wireless device attempting to reattach to the wireless network using the non-temporary IMSI. This may involve the wireless device being restarted and attaching to the wireless network in a conventional way using the non-temporary IMSI. Since the non-temporary IMSI is being used to attach with the wireless network, the wireless network may not be configured to route data related to the wireless device to the detection device.

At step 830, if the wireless device has successfully attached the wireless network using the non-temporary IMSI, a notification may be received by the detection device from the HLR that indicates the wireless device associated with the non-temporary IMSI and non-temporary MSISDN is available to receive the SMS message (or, has received the SMS message). By receiving the indication that indicates the wireless device associated with the non-temporary IMSI is available to receive the SMS text message, the detection device can infer that the wireless device has successfully attached with the wireless network using the non-temporary IMSI (and non-temporary MSISDN). While method 800 relies on the use of an SMS text message, some other form of message being registered with the HLR for delivery to the wireless device may be used in order to confirm that the wireless device has reattached to the wireless network properly with the new IMSI.

If the detection device does not receive confirmation that the wireless device has successfully attached to the network using the non-temporary IMSI, messages may be retransmitted to the AUC and/or the HLR to attempt to cure the error. Further, another SMS text message may be registered with the HLR for delivery to the wireless device now associated with the non-temporary IMSI in another attempt to confirm that the wireless device has attached properly using the non-temporary IMSI with the wireless network.

Figure 9:
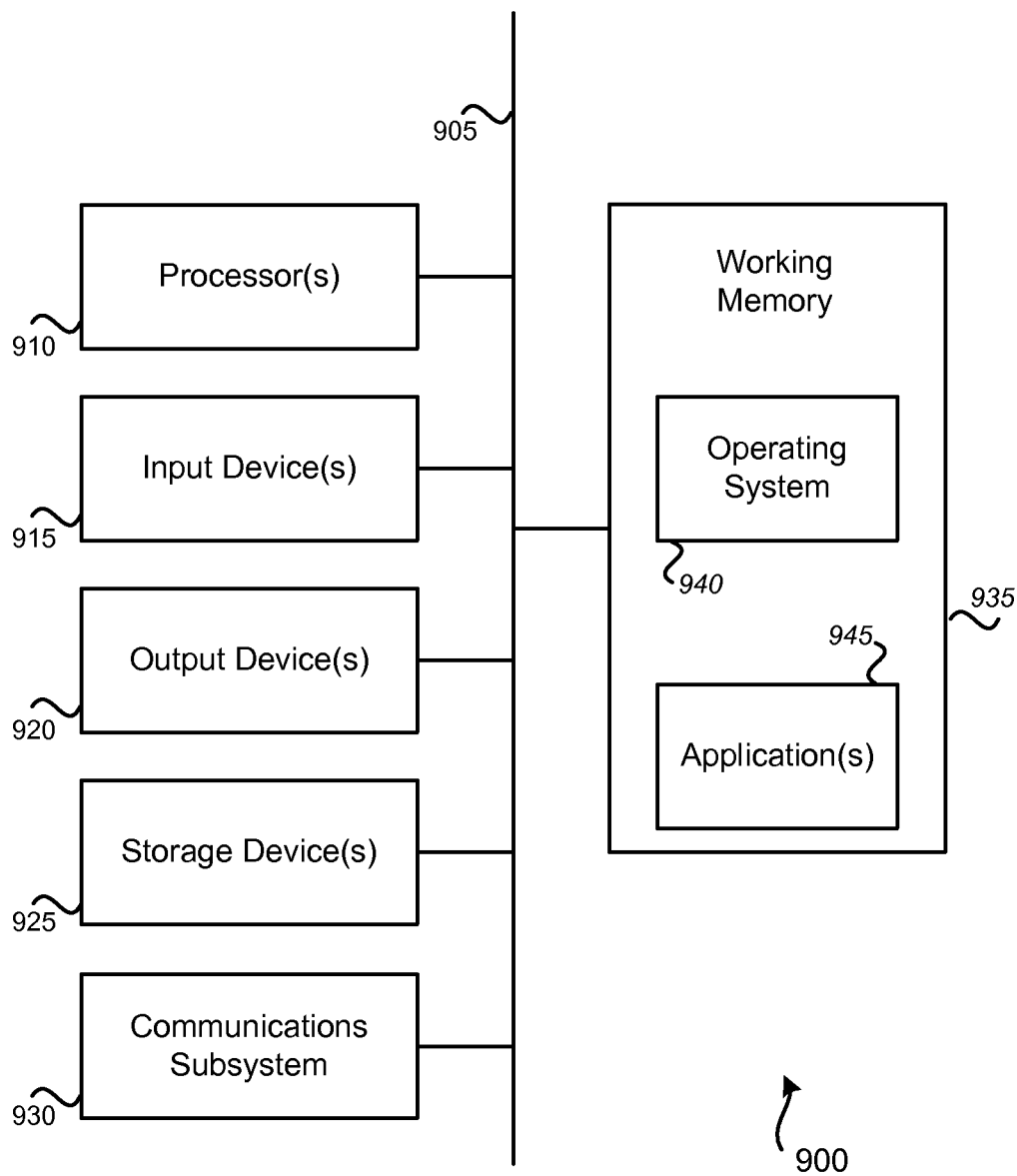
FIG. 9 illustrates an embodiment of a computer system.

FIG. 9 illustrates an embodiment of a computer system. A computer system as illustrated in FIG. 9 may be incorporated as part of the previously described computerized devices. For example, computer system 900 can represent some of the components of the wireless devices, MSCs, VLRs, BSCs, AUCs, detection devices, HLRs, and/or activation systems. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for activating a wireless device on a wireless network, the method comprising:
  receiving an authentication request based on the wireless device attempting to attach to the wireless network, wherein
    the authorization request specifies an international mobile subscriber identity (IMSI);
  comparing the IMSI to a set of stored blocked IMSIs, wherein
    each IMSI of the set of stored blocked IMSIs is prohibited from being used to access the wireless network;
  in response to the comparison, determining the wireless device that corresponds to the IMSI is permitted to be attached to the wireless network; and
  in response to determining the wireless device is permitted to attach to the wireless network, causing authentication of the wireless device, wherein the authentication comprises:
    selecting an authentication center (AUC) from a plurality of AUCs of the wireless network to receive authentication information corresponding to the wireless device based on a response time of the AUC; and
    transmitting the authentication information corresponding to the wireless device to the selected AUC.

2. The method for activating the wireless device on the wireless network of claim 1, further comprising:
routing, by the wireless network, the authentication request to a detection device based on the IMSI, wherein the detection device is separate from an HLR of the wireless network.

3. The method for activating the wireless device on the wireless network of claim 2, wherein causing authentication of the wireless device comprises:
transmitting an authentication response comprising security information to a mobile switching center of the wireless network, wherein the mobile switching center services the wireless device.

4. The method for activating the wireless device on the wireless network of claim 1, further comprising:
identifying a second IMSI corresponding to a second wireless device that has violated at least a rule of a set of rules; and
in response to identifying the second IMSI corresponding to the second wireless device that has violated at least the rule of the set of rules, adding the second IMSI to the set of stored blocked IMSIs.

5. The method for activating the wireless device on the wireless network of claim 4, wherein the rule defines a limit on a number of signaling messages permissible to be received from wireless devices.

6. The method for activating the wireless device on the wireless network of claim 1, further comprising:
receiving a command from an administrator, to add a second IMSI to the set of stored blocked IMSIs; and
in response to receiving the command, adding the second IMSI to the set of stored blocked IMSIs.

7. The method for activating the wireless device on the wireless network of claim 1, further comprising:
transmitting provisioning information corresponding to the wireless device to the plurality of AUCs of the wireless network; and
receiving a response from at least one of the plurality of AUCs.

8. The method for activating the wireless device on the wireless network of claim 1, further comprising:
assigning a temporary mobile subscriber integrated services digital network number (MSISDN) to the wireless device that corresponds to the IMSI, wherein the IMSI is a temporary IMSI.

9. The method for activating the wireless device on the wireless network of claim 1, further comprising:
assigning a non-temporary MSISDN and a non-temporary IMSI to the wireless device;
after assigning the non-temporary MSISDN and the non-temporary IMSI to the wireless device, transmitting a first message to a home location register (HLR) of the wireless network, wherein:
the first message is for delivery to the wireless device; and
receiving a message from the HLR indicating that the wireless device is available to receive the message.

10. A detection device for activating a wireless device on a wireless network, the detection device comprising:
a processor; and
a memory communicatively coupled with and readable by the processor and having stored therein processor-readable instructions which, when executed by the processor, cause the processor to:
receive a request from the wireless network for authentication of the wireless device, wherein:
the request specifies an international mobile subscriber identity (IMSI) corresponding to the wireless device;
compare the IMSI to a set of stored blocked IMSIs, wherein
each IMSI of the set of stored blocked IMSIs is prohibited from being used to access the wireless network;
in response to the comparison, determine the wireless device that corresponds to the IMSI is permitted to be attached to the wireless network; and
in response to determining the wireless device is permitted to attach to the wireless network, cause the wireless device to be authenticated, wherein the processor-readable instructions that cause the processor to cause the wireless device to be authenticated comprises processor-readable instructions that cause the processor to:
select an authentication center (AUC) from a plurality of AUCs of the wireless network to receive authentication information corresponding to the wireless device based on a response time of the AUC; and
cause the authentication information corresponding to the wireless device to be transmitted to the selected AUC.

11. The detection device for activating the wireless device on the wireless network of claim 10, wherein the processor-readable instructions for causing the wireless device to be authenticated comprises processor-readable instructions configured to cause the processor to:
perform authentication of the wireless device; and
cause an authentication response comprising security information to be transmitted to a mobile switching center of the wireless network.

12. The detection device for activating the wireless device on the wireless network of claim 10, wherein the processor-readable instructions for causing the wireless device to be authenticated comprises processor-readable instructions configured to cause provisioning information corresponding to the wireless device to be transmitted to the plurality of AUCs of the wireless network.

13. The detection device for activating the wireless device on the wireless network of claim 10, wherein the processor-readable instructions further comprise processor-readable instructions which, when executed by the processor, cause the processor to:
identify a second IMSI corresponding to a second wireless device that has violated at least a rule of a set of rules; and
in response to identifying the second IMSI corresponding to the second wireless device that has violated at least the rule of the set of rules, add the second IMSI to the set of stored blocked IMSIs enforced by the detection device.

14. The detection device for activating the wireless device on the wireless network of claim 10, wherein the processor-readable instructions further comprise processor-readable instructions which, when executed by the processor, cause the processor to:
assign a non-temporary MSISDN and a non-temporary IMSI to the wireless device;
after assigning the non-temporary MSISDN and the non-temporary IMSI to the wireless device, cause a first message to be transmitted to a home location register (HLR) of the wireless network, wherein:
the first message is for delivery to the wireless device; and process a message received from the HLR indicating that the wireless device is available to receive the message.

15. The detection device for activating the wireless device on the wireless network of claim 10, wherein the IMSI received in the request is a temporary IMSI.

16. A detection apparatus for activating a wireless device on a wireless network, the detection apparatus comprising:
- means for receiving a request from the wireless network for authentication of the wireless device, wherein the request specifies an international mobile subscriber identity (IMSI) corresponding to the wireless device;
- means for comparing the IMSI to a set of stored blocked IMSIs, wherein
  - each IMSI of the set of stored blocked IMSIs is prohibited from being used to access the wireless network;
  - means for determining, in response to the comparison, the wireless device that corresponds to the IMSI is permitted to be attached to the wireless network; and
- means for causing the wireless device to be authenticated in response to determining the wireless device is permitted to attach to the wireless network, wherein the means for causing the wireless device to be authenticated comprises:
  - means for selecting an authentication center (AUC) from a plurality of AUCs of the wireless network to receive authentication information corresponding to the wireless device based on a response time of the AUC; and
  - means for transmitting the authentication information corresponding to the wireless device to the selected AUC.

17. The detection apparatus for activating the wireless device on the wireless network of claim 16, the detection apparatus further comprising:
- means for assigning a non-temporary IMSI to the wireless device, wherein the IMSI of the request is a temporary IMSI;
- means for transmitting a first message to a home location register (HLR) of the wireless network after assigning the non-temporary IMSI to the wireless device, wherein the first message is for delivery to the wireless device;
- means for receiving a message from the HLR indicating that the wireless device is available to receive the message.

18. The detection apparatus for activating the wireless device on the wireless network of claim 16, the detection apparatus further comprising:
- means for transmitting provisioning information corresponding to the wireless device to the plurality of AUCs of the wireless network; and
- means for receiving a response from at least one of the plurality of AUCs.

* * * * *